(12) United States Patent
Zakai et al.

(10) Patent No.: US 7,640,944 B2
(45) Date of Patent: Jan. 5, 2010

(54) VALVE FOR PREVENTION OF LOW FLOW RATES THROUGH FLOW METER

(75) Inventors: Avraham Zakai, Zichron Yaakov (IL); Jonathan Bar-Or, Jordan Valley (IL)

(73) Assignee: A.R.I. Flow Control Accessories Agricultural Cooperative Association Ltd., D.N. Ramat Hagolan (IL)

( * ) Notice: Subject to any disclaimer, the term of this patent is extended or adjusted under 35 U.S.C. 154(b) by 154 days.

(21) Appl. No.: 10/527,198

(22) PCT Filed: Sep. 4, 2003

(86) PCT No.: PCT/IL03/00727

§ 371 (c)(1),
(2), (4) Date: Mar. 10, 2005

(87) PCT Pub. No.: WO2004/025229

PCT Pub. Date: Mar. 25, 2004

(65) Prior Publication Data

US 2005/0268969 A1  Dec. 8, 2005

(30) Foreign Application Priority Data

Sep. 12, 2002  (IL) .................................... 151748

(51) Int. Cl.
 *F16K 15/02* (2006.01)
(52) U.S. Cl. .......................... 137/14; 137/540; 137/220; 137/513.3; 137/514.3; 137/543.17; 251/65
(58) Field of Classification Search ................ 137/220, 137/513.3, 513.7, 514, 514.3, 514.7, 540, 137/543.17, 242, 244, 533.17, 533.31, 14; 251/65, 337
See application file for complete search history.

(56) References Cited

U.S. PATENT DOCUMENTS

| 832,619 | A | * | 10/1906 | Nash ............................ 73/199 |
| 1,808,209 | A | | 6/1931 | Earl |
| 1,808,212 | A | | 6/1931 | Earl |
| 3,395,579 | A | | 8/1968 | Stoten |
| 3,990,299 | A | * | 11/1976 | Coffman ....................... 73/199 |
| 4,498,497 | A | * | 2/1985 | Rosaen ................... 137/599.13 |
| 5,218,346 | A | | 6/1993 | Meixler |
| 5,623,957 | A | * | 4/1997 | Lekholm ..................... 137/246 |
| 5,921,276 | A | * | 7/1999 | Lam et al. ................. 137/514.7 |
| 6,132,191 | A | * | 10/2000 | Hugenroth et al. ......... 418/55.1 |
| 2002/0189687 | A1 | * | 12/2002 | Linthorst .................... 137/522 |

FOREIGN PATENT DOCUMENTS

WO   WO 99/28722   6/1999

* cited by examiner

*Primary Examiner*—Kevin L Lee
(74) *Attorney, Agent, or Firm*—The Nath Law Group; Susanne M. Hopkins; Derek Richmond

(57) ABSTRACT

A flow responsive valve for a flow metering system comprising a fluid meter having a minimum measuring flow threshold. The valve is shiftable between an open position at flow rates above the minimum measuring flow threshold, and a pressure pulsating position depending on pressure differential over an inlet port and an outlet port of the valve. The pressure pulsating position alters between a closed position essentially prohibiting fluid flow therethrough at flow rates below the minimum measuring flow threshold, and an open position admitting fluid flow into the supply line at a measurable flow rate above the minimum measuring flow threshold.

40 Claims, 8 Drawing Sheets

VALVE FOR PREVENTION OF LOW FLOW RATES THROUGH FLOW METER

FIELD OF THE INVENTION

This invention relates to a method, a system and a device for metering fluid flow. More particularly the invention is concerned with a method rendering a conventional fluid meter suitable for metering also significantly low flow rates, even below the measurable flow rate of the metering device. The invention is further concerned with a fluid flow measuring system and a device useful for carrying out the method.

BACKGROUND OF THE INVENTION

The measurement and monitoring of low volume fluid flows has various applications including applications in industrial and residential settings. For example, in the chemical industry the accurate and precise knowledge of inlet and outlet flows for a myriad of processes (e.g. chemical reactions) can be critical to the optimal production and processing of chemicals, pharmaceuticals and the like. Precise monitoring of flows can also be used to discover and prevent leaks which can be costly and be a safety issue.

Additionally, the lack of low-flow monitoring can result in losses to the suppliers of such flow. For example, water companies are compensated for water usage as measured by their flow monitors (water meters). If their flow monitors do not measure trickle or drip flow, they are not reimbursed for such usage. The loss of revenue can be considerable. Additionally, the location of the loss is not detected thereby allowing a large amount of water to be wasted. This is particularly an issue in the many countries with limited water supplies. Furthermore the knowledge of this monitoring limitation can be used to steal water, for example by slowly dripping water into a holding tank, at a rate not measurable by the associated flow meter, and consuming the water directly from the tank.

Turbine flow meters, which are the conventional magnetic flow meters in general use today have long been used to measure fluid flow by means of a turbine immersed in the fluid. A magnet connected to the turbine turns a second magnet, which is placed in a dry area. The second magnet drives a cog system that turns a mechanical counter. These flow meters are unable to detect low flows e.g. below about 10 l/h when considering a typical water meter of the type installed by water supply companies and municipalities world wide. Positive displacement metering devices are also commonly used to measure flow rate and they have deficiencies in particular where water is of poor quality i.e. has a high calcium content or contains dirt such as sand.

Other types of flow meters are also known, some of which are devices for measuring low volumetric fluid flow. However such meters are typically costly, require servicing and are difficult to retrofit, thus are usually not used for domestic water metering.

Droplet counter devices are also known, wherein a sensor is provided for droplet count. However, such devices usually service for laboratories and are not cost-effective in massive installation, e.g. for use by a water supply company, certainly not for urban use. Even more so, such systems are not easily retrofitted and they require some considerable space.

For example, disclosed in U.S. Pat. No. 5,218,346 to Meixler is a low volume flow meter for determining if a fluid flow meets a minimum threshold level of flow. The monitor includes an externally located electrical portion, which operates with a minimum of intrusion to the flow and allows for repairs. The electronics provide for the adjustment of the threshold level and can be modified to provide for a parallel electronic circuit for a bracketing of the desired flow rate. However, the system is not simple or inexpensive.

Another type of flow rate device that has the capacity to measure or monitor a low flow rate is a compound meter. In this case, the device comprises a high flow metering device together with a secondary flow meter that is typically located in a by-pass conduit. There is typically some means for diverting flow (e.g. by using a "change-over" valve set to activate at a pre-determined pressure) based on a pre-determined flow rate or pressure in order to direct the flow to the appropriate meter. These meters typically suffer from at least some of the above-mentioned drawbacks and in particular are expensive.

A problem which may occur with flow metering devices is so-called 'over-efficient', where the flow meter may read excessive amounts of fluid, which in fact have not flown through the system. This may result for example, owing to inertial revolutions of the measuring impeller of the metering device.

SUMMARY OF THE INVENTION

According to the invention there is provided a fluid supply system comprising a supply line and flow metering device and a flow responsive valve; said flow metering device admitting flow through the system for only measurable fluid flow.

The arrangement is such that when flow rate exceeds a minimal measurable flow rate threshold the valve is open owing to a pressure differential over its inlet port and outlet port; and when the flow rate drops below said minimal measurable flow rate threshold, the valve enters a pulsating position having a closed state thereby substantially restricting flow through the system, and an open state allowing fluid flow into the system; said open state having a flow rate exceeding the minimal measurable flow rate threshold; where portions of the supply line downstream of the flow meter and devices fitted thereon function as a fluid accumulator.

According to the invention, an average fluid flow through the system remains constant over time, whereby a consumer downstream of said metering device does not acknowledge flow rate fluctuations imparted by the system according to the present invention.

According to the invention, there is a fluid metering system comprising a fluid supply line and a meter for measuring fluid flow therethrough, said meter having a minimum measuring flow threshold; the system further comprising a flow responsive valve imparting the system with a flow pattern having a pulsating character so as to substantially prohibit flow at a flow rate below the minimum measuring threshold, and resume flow of only measurable quantities of fluid. The flow responsive valve is in fact responsive to flow rate and to pressure differential extending between an inlet and an outlet of the valve.

According to another aspect the present invention is concerned with a method for metering fluid flow through a fluid supply line comprising a flow meter having a minimum measurable threshold and a flow responsive valve imparting a flow pattern therethrough with a pulsating character so as to substantially restrict flow at a flow rate below the minimum measuring threshold, and resume flow of only measurable quantities of fluid. The arrangement is such that the fluid supply line and any devices fitted thereon function as an accumulator, whereby at an open state of the flow responsive valve, during its open phase, fluid accumulates in the system.

The present invention is also directed to a valve comprising an inlet port connectable to an upstream side of a fluid supply line, and an outlet port connectable to an downstream side of the fluid supply line; a control chamber extending between the inlet port and the outlet port and a sealing member disposed within said control chamber, said sealing member having an inlet sealing surface having a sealing surface area and a control portion having a control surface area; and a bleed aperture determining a minimal flow threshold through the control chamber; wherein the sealing member displaces between an open position and a closed position depending on a pressure differential over the sealing member.

A fluid supply system according to the concerned invention is suitable for use with gases or liquids and has a significant advantage of being inexpensive, reliable and suitable for easy retrofit installation on existing flow metering systems.

A further advantage of the device in accordance with the present invention is that it serves also as a one way valve preventing flow from a downstream direction to an upstream direction, i.e. from the consumer towards the supplier, in the case of a liquid supply system.

According to another embodiment of the present invention there is provided a flow responsive valve according to the invention, further fitted for controlled restriction of fluid flow at the open state of the pulsating position of the device. Accordingly, an impeller of a flow meter fitted in conjunction with a valve according to this embodiment will not reach significant revolutionary speed and inertial force is reduced, thereby governing the overriding excessive metering. However, the valve according to this embodiment substantially does not effect fluid flow and metering at a consuming state thereof, i.e. when flow rate exceeds a minimal measurable flow rate threshold.

BRIEF DESCRIPTION OF THE DRAWINGS

In order to understand the invention and to see how it may be carried out in practice, some embodiments will now be described, by way of non-limiting examples only, with reference to the accompanying drawings, in which:

FIGS. 3A and 3B are longitudinal sections through a flow responsive valve according to an embodiment of the present invention, wherein:

FIG. 3A illustrates the valve in its open position; and

FIG. 3B illustrates the valve in its closed position;

FIGS. 4A and 4B are longitudinal sections through a flow responsive valve according to another embodiment of the present invention wherein:

FIG. 4A illustrates the valve in its open position; and

FIG. 4B illustrates the valve in its closed position;

FIG. 5 is a longitudinal section through a flow responsive valve according to still an embodiment of the present invention, wherein:

DETAILED DESCRIPTION OF THE INVENTION

The present invention is suitable for implementation in a variety of fluid supply systems, however, for the sake of convenience and for exemplifying only, references hereinafter is made to a water supply system, e.g. an urban/municipal water supply network.

Figure 1:
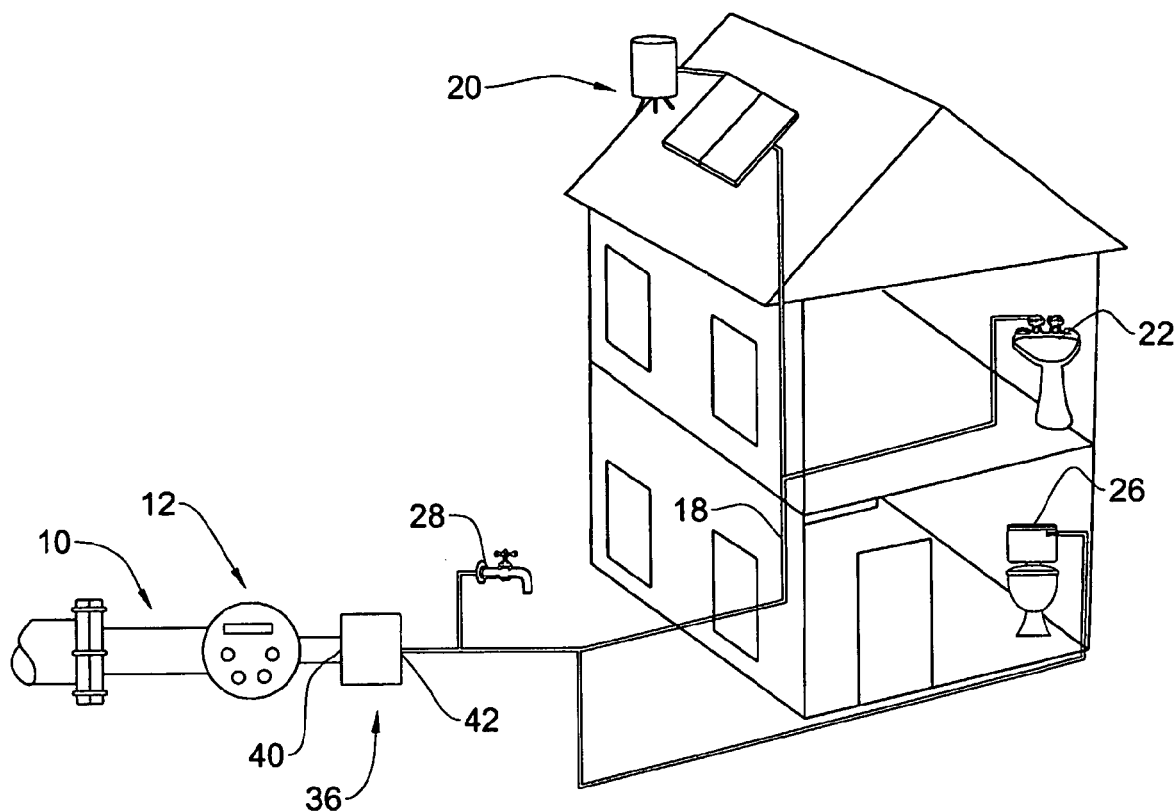
FIG. 1 is a schematic representation of a municipal water supply network fitted with a flow metering system according to the present invention.

Attention is first directed to FIG. 1 of the drawings schematically illustrating an end portion of an urban/municipal water supply system wherein an end use is for example a house, an office, a plant etc. The house, in the present example, is connected to a main water supply line designated 10 via a flow meter 12 with a suitable network of pipes 18 branching for example to end devices such as a solar water heating system 20, wash basins 22, toilets 26 and garden faucets 28.

Each of the above end items, including the piping 18 is vulnerable to leaks owing to faulty sealing means (washers, gaskets, etc.), leaks in the piping, poor connections, etc.

In a water supply system not fitted with a device in accordance with the present invention, any such leaks which are below the minimal measurable flow threshold (a common such minimal threshold is about 10 liter/hour) would not be detected and would not be measurable, i.e. causing the water supplier considerable loss, not to mention the waste of fresh water which in some regions in the world is an acute problem.

In order to render a standard flow meter 12 capable of measuring also small amounts of water, there is installed a flow responsive valve generally designated 36. The valve 36 is sensitive to flow rate and pressure differential over its inlet and outlet ports, as will be explained hereinafter in more detail.

The valve 36 is a normally closed valve which opens whenever an end device is opened for consumption of water, e.g. upon flushing the toilet 26 or the like, when the consumed rate exceeds the minimal measurable flow threshold. However, when there is no consumption of water by either of the end devices, the valve 36 spontaneously returns to its closed position. If a leak occurs at one or more locations along the piping 18 or at one or more of the end devices 20, 22, 26 and 28, the flow responsive valve 36 remains closed whereby a pressure differential $\Delta P$ is being built between an inlet 40 connected upstream and an outlet 42 connected downstream. Such a pressure differential is built owing to the essentially constant pressure at the inlet 40 and the dropping pressure at outlet 42. When the pressure differential $\Delta P$ reaches a predetermined threshold, the flow responsive valve 36 opens for a while, to allow water flow to the piping 18 until the valve reaches a pressure differential lower then a predetermined pressure threshold.

Figure 2:
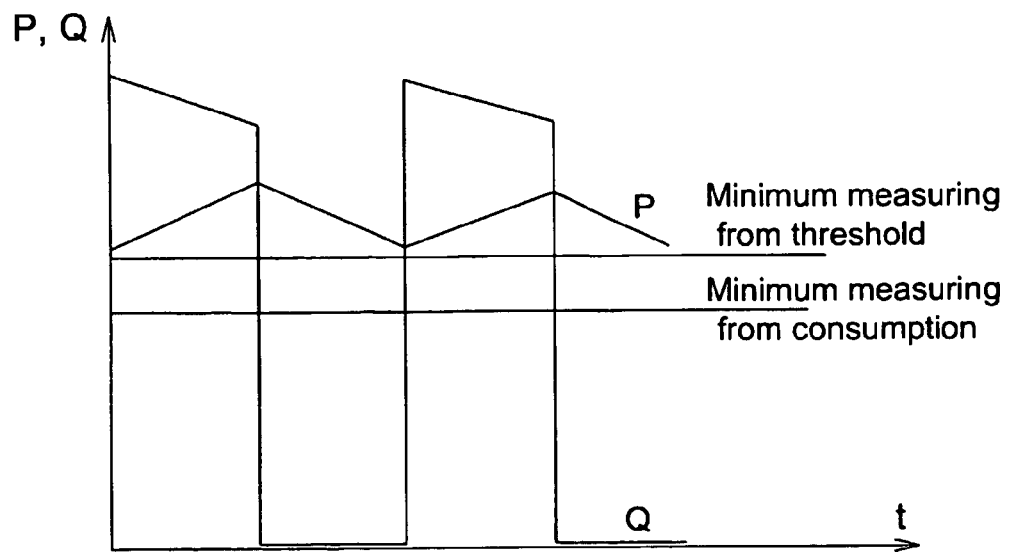
FIG. 2 is a superimposed graph schematically illustrating the pressure and flow rate over time, in a water supply network fitted with a system according to the present invention.

FIG. 2 is a superimposed graph schematically illustrating the pressure and flow rate over time, measured downstream of the flow responsive valve 36. The upper horizontal line represents the minimal measurable flow threshold of the metering device 12 whilst the lower horizontal line represents the flow consumption during a low flow consumption, e.g. owing to several leaks at the piping 18 and/or end devices 20, 24, 26, and 28 which are below the minimum measurable flow threshold of the metering device 12. The graph represented by the letter Q represents the pulsating flow character through the flow meter where it is noticeable that flow is always above the minimum measurable flow threshold of the metering device 12 and operates in an on/off mode, i.e. all flow through the meter 12 is measurable. The line represented by the letter P illustrates the corresponding pressure in the system which also has a pulsating character.

Further attention will now be directed to several embodiments of a pressure sensitive valve in accordance with embodiments of the present invention by way of examples only. It is appreciated that many other embodiments are possible as well.

Figure 3A:
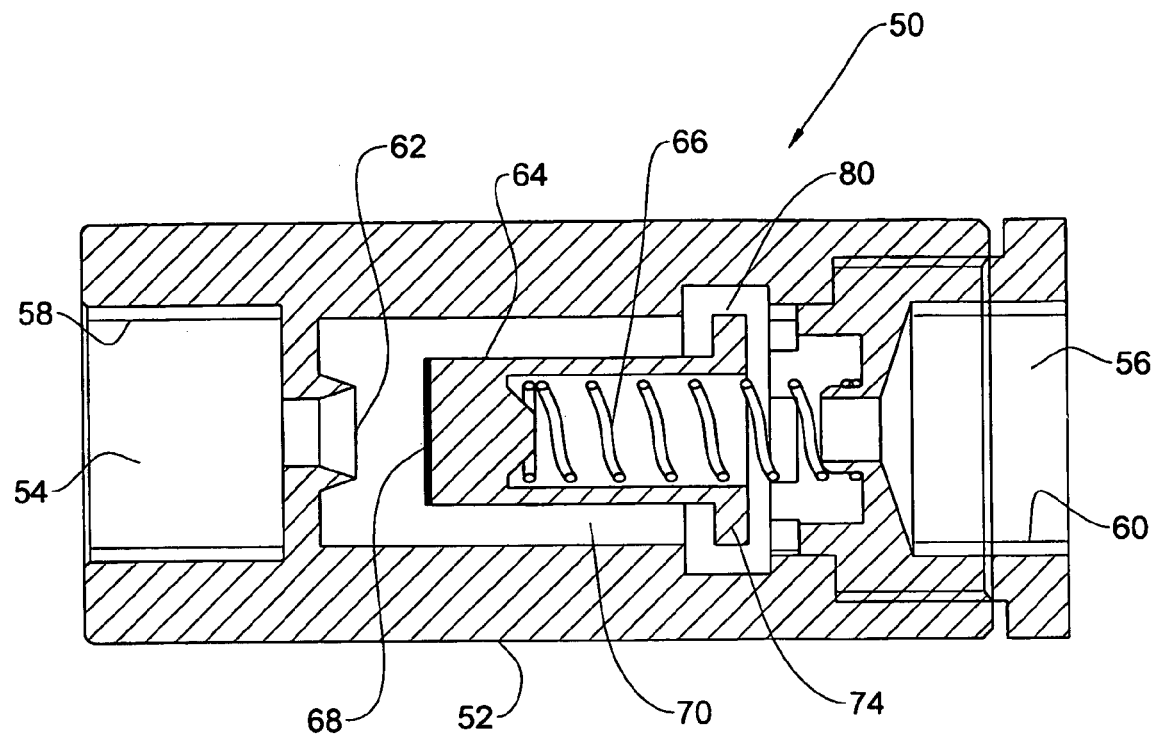
Figure 3B:
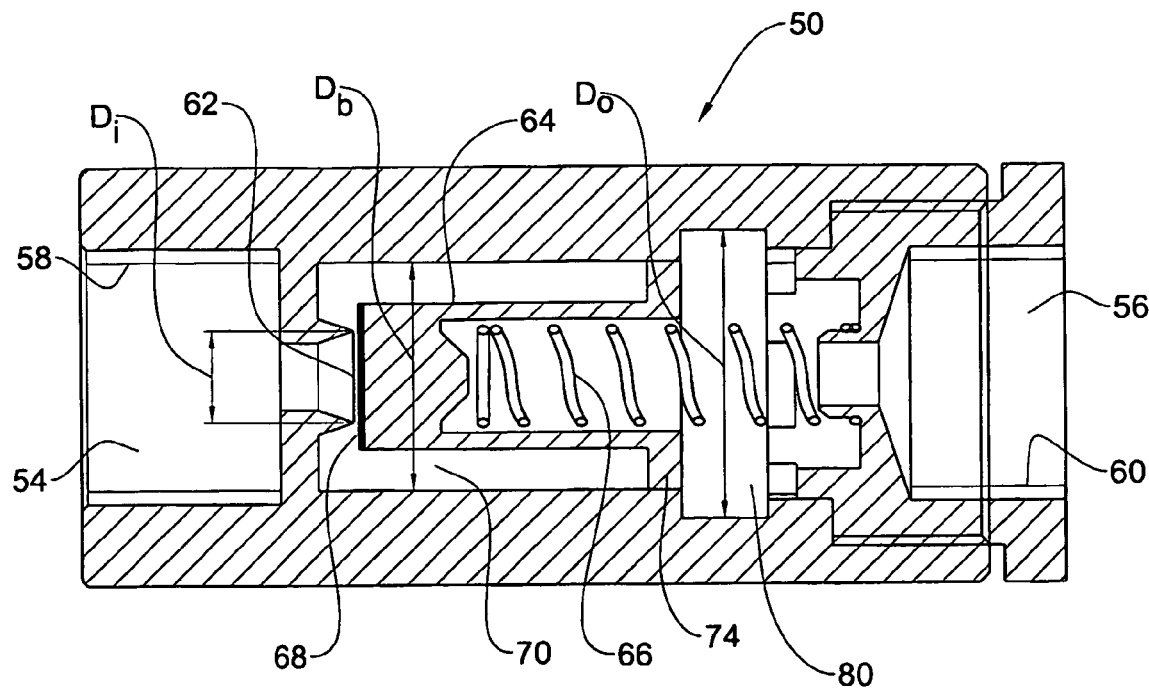

Turning now to FIGS. 3A and 3B, reference is made to a valve generally designated 50 which in FIG. 3A is illustrated in its open position and in FIG. 3B is illustrated in its normally closed position. The valve 50 comprises a housing 52, an inlet port 54 and an outlet port 56 both fitted for screw coupling to a pipe section (not shown) by suitable threadings 58 and 60, respectively.

The valve 50 is fitted with an inlet nozzle 62 having a diameter $D_i$. A sealing member 64 is axially displaceable within the housing 52 and is normally biased by means of coiled spring 66 into a normally sealed position, so as to seal the inlet nozzle 62 (FIG. 3B).

Sealing member 64 is fitted at an inlet end thereof with a resilient sealing portion 68 for improved sealing of the inlet nozzle 62. Furthermore, and as noted in the figures, the housing 52 has a central bore 70 slidingly supporting the sealing member 64, said bore 70 having a diameter $D_b$. Sealing member 64 has at an outlet end thereof adjacent a shoulder portion 74 having a predetermined tolerance with the bore 70, said tolerance determining a leak rate corresponding with the pulsating sequence imparted to the sequence, as discussed above.

Further noticeable, bore 70 is formed at an outlet side thereof with an expanded portion 80 of diameter $D_o$.

The arrangement is such that when the valve 50 is in its open position, the should portion 74 of the sealing member 64 reaches the expanded portion 80 to allow essentially free flow through the valve 50.

The arrangement is such that the biasing force Fs of the spring 66 is predetermined whereby the valve 50 remains in its closed position as long as the pressure differential ΔP does not exceed a predetermined pressure determined by the relationship between $D_i$, Fs and the pressure at the inlet port 54 and outlet port 56. Thus, the force required to open the valve 50 is determined by Fs<ΔP*A($D_i$), where A($D_i$) is the surface area at the inlet nozzle 62. Similarly, the valve 50 will close when ΔP<Fs/A($D_o$), where A($D_o$) is the surface area at the expanded portion 80. It is also apparent that the pressure differential required for closing the valve 50 is lower than that required for generating a pulse in the system, this being since $D_i$<$D_o$.

The arrangement is such that when the pressure differential over the inlet port 54 and outlet port 56 is smaller than a predetermined threshold, the valve 50 remains sealed since the only force acting is the biasing force Fs of spring 66. However, when pressure at the outlet port 56 drops (e.g. upon a leak at the piping of the system or at one of the end devices, as discussed hereinabove) and there the inlet pressure at inlet port 54 remains essentially constant, the pressure differential over the valve 50 increases and the sealing member 64 will displace into its open position as in FIG. 3A.

Furthermore, it is appreciated that the shoulders 74 of the sealing member 64 take the role in retaining the sealing member in the open position under a pressure differential. It is further appreciated that the tolerance between the diameter of the shoulder 74 and the bore 70 in fact determines the pulsating timing, as it determines a so-called leak rate of the system.

Further attention is now directed to FIGS. 4A and 4B in which a valve 80 is principally similar to the valve discussed hereinabove in connection with FIGS. 3A and 3B and accordingly, reference is made only to the differing element which is the shape of the shoulder 84 of the sealing member 86 and the corresponding change in shape of the expanded portion 88 of the cylindric bore 90 of the housing. The purpose of this particular design is to give rise to a narrow flow path 91 when the valve is in its open positions as in FIG. 4, to thereby give rise to an increased flow velocity and at the bore 90, generating a force acting to the direction of arrow 92 (FIG. 4A) namely in the direction to assist in displacing the sealing member 86 into an open position, contrary to the force imparted by coiled spring 94. This is obtained by local increase of flow velocity causing low static pressure down stream, thus decreasing the head loss.

Figure 4A:
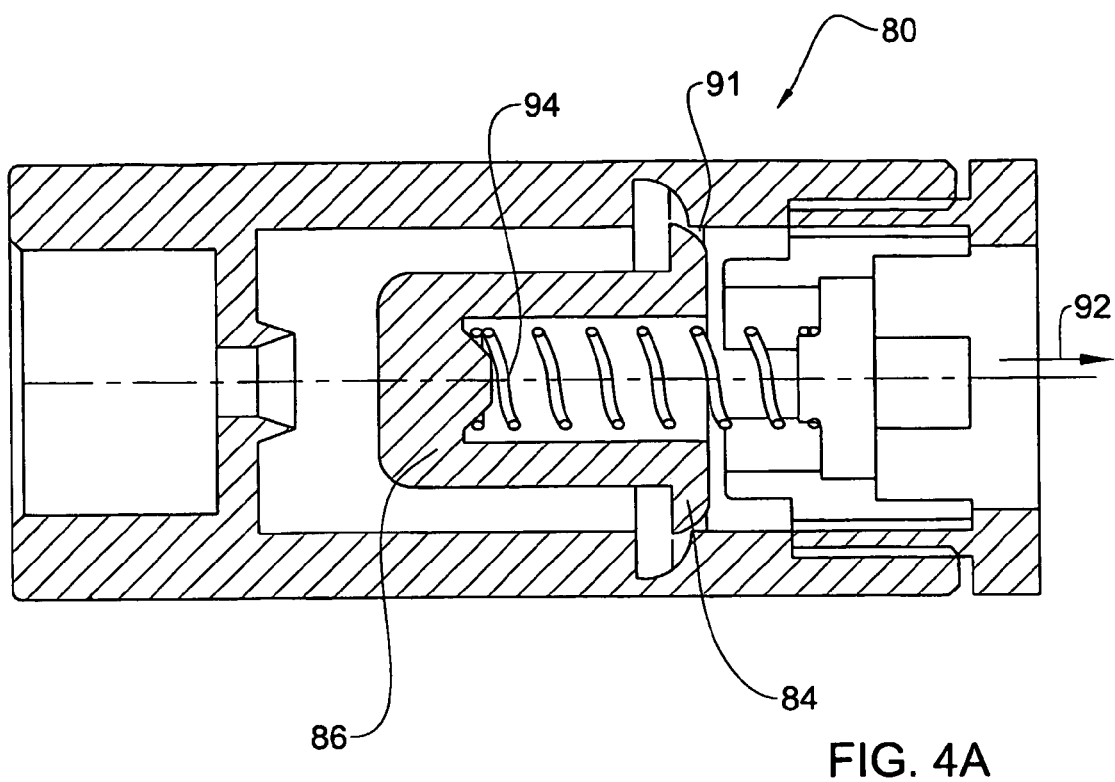
Figure 4B:
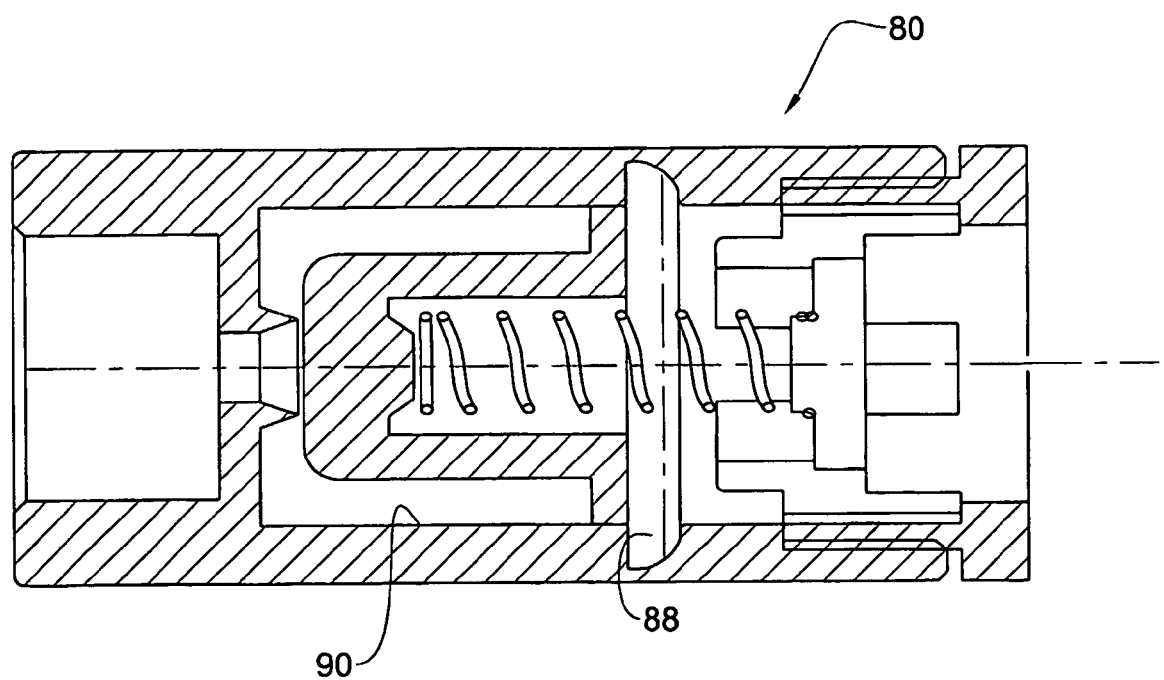

The design of FIGS. 4A and 4B renders the valve 30 oven/closed position more significant and avoids undefined positions and scattering of the valve at near to equilibrium position.

Figure 5A:
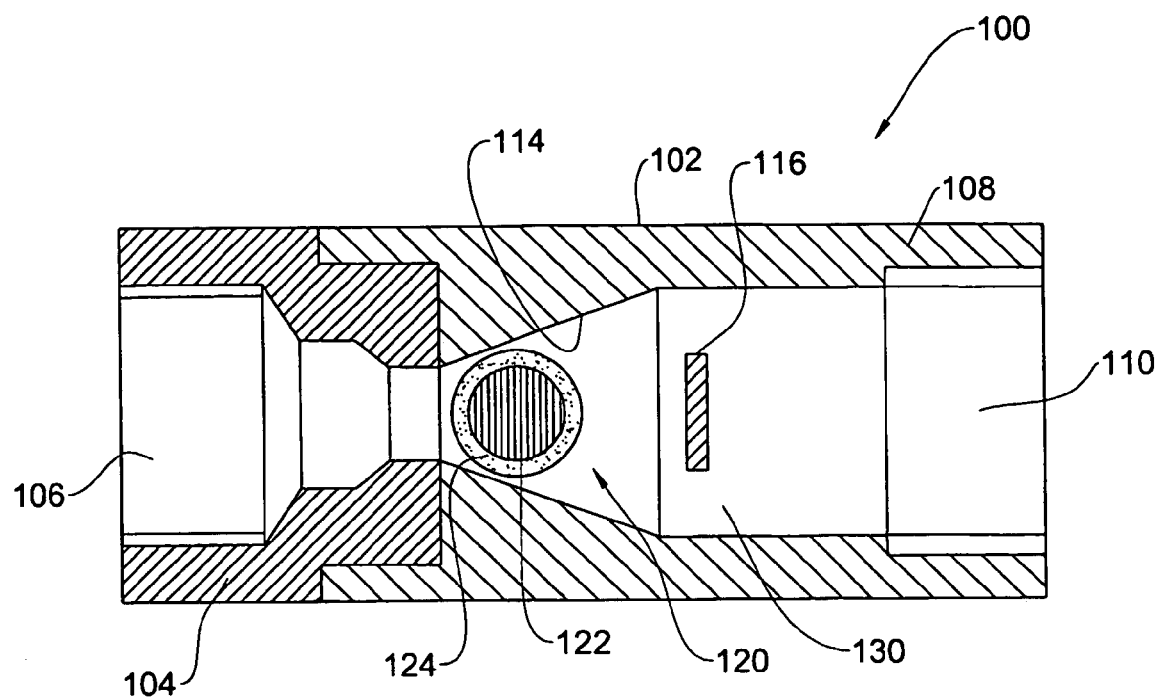
FIG. 5A illustrates the valve in its open position.
Figure 5B:
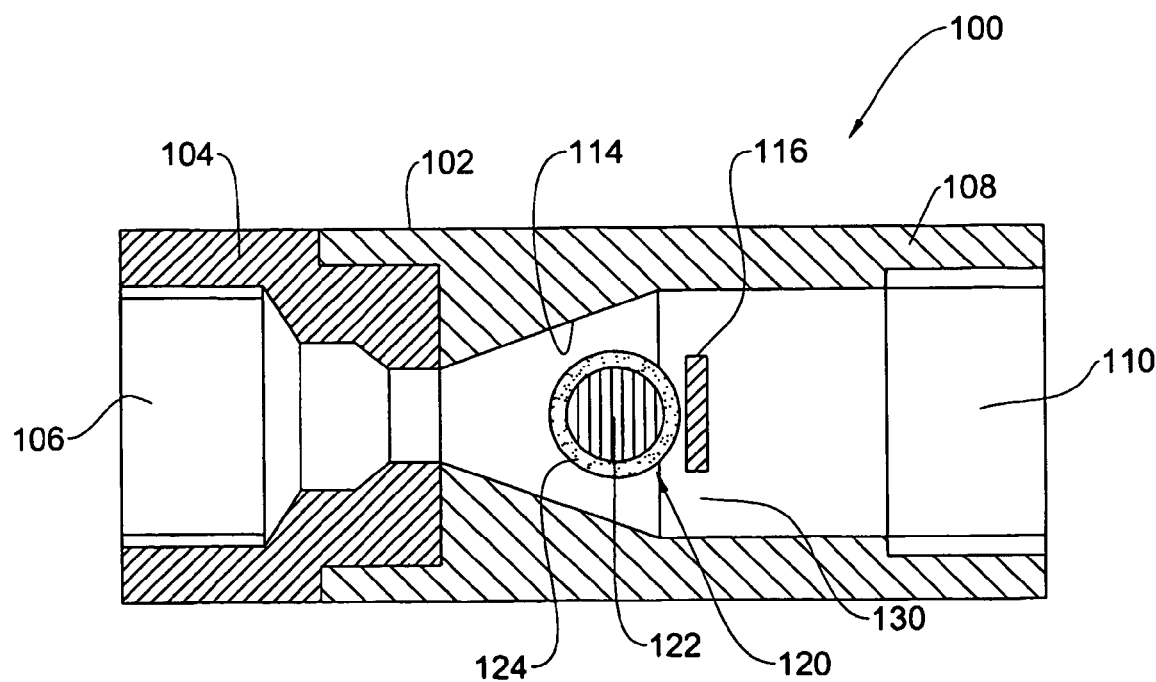
FIG. 5B illustrates the valve in its closed position.

FIGS. 5A and 5B illustrate still another embodiment of a pressure sensitive valve in accordance with the present invention generally designated 100 wherein the sealing force is imparted by magnetic means, rather than by a coiled spring as in the previous embodiment.

As can be seen in FIGS. 5A and 5B, the housing comprises an inlet segment 104 formed with an inlet port 106, and an outlet segment 108 fitted with an outlet port 110, both said inlet and said outlet being fitted with a suitable threading for coupling to a pipe segment (not shown).

Outlet segment 108 is formed adjacent the inlet segment 104 with a tapering portion 114 and with a stopper member 116. A sealing member 120 being a magnetic sphere 122 coated with a resilient layer 124, has a diameter larger than the narrow most portion of the tapering wall 114 and similarly, the diameter of the sealing member 120 is larger than the gaps 130 of stopper member 116. The arrangements is such that the sealing member 120 is displaceable within the housing between a closed position (FIG. 5A) wherein it sealingly engages the tapering wall portion 114, and an open position (FIG. 5B) wherein it disengages from the tapering portion 114 to allow free flow through the valve 100.

The biasing force is imparted on the sealing member 120 by means of the magnetic inlet member 104 acting on the magnetic sphere 122 of sealing member 120 into sealing engagement with the narrow most portion of the tapering wall portion 114.

The valve in accordance with the embodiment of FIGS. 5A and 5B operates in a similar manner as discussed in connection with the valves of FIGS. 3 and 4 and the reader's attention is directed thereto.

A further advantage of the valve in accordance with the present invention, is that it serves also as a one way valve preventing flow from a downstream direction (i.e. from the consumer) to an upstream direction (i.e. towards the supplier). This feature is of particular importance e.g. in connection with a water supply system and serves to prevent flow of contaminated water towards the supplier in case of a flood or burst in supply pipes, where there is risk of mud and dirt entering the system and flowing upstream and possibly contaminating water reservoirs and harming equipment of the water supplier.

Figure 6:
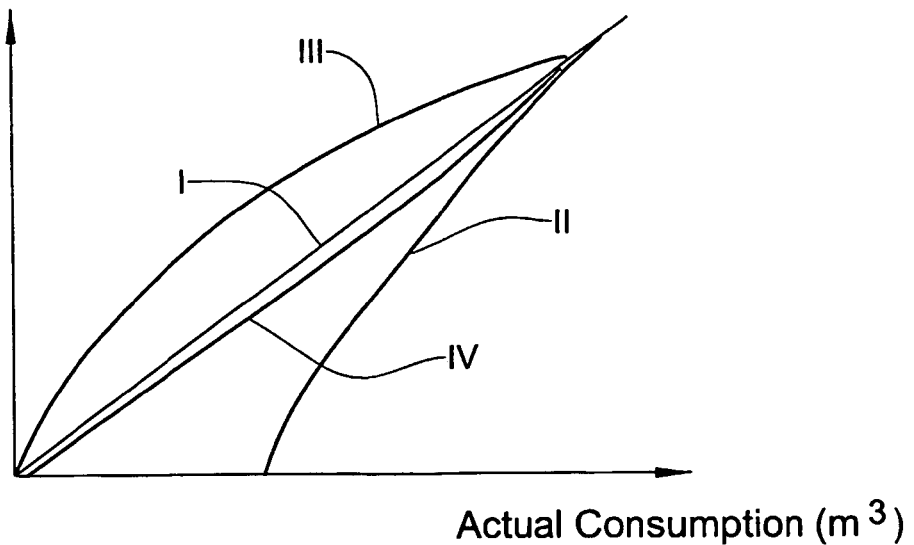
FIG. 6 is a schematic graph representing actual flow Vs. measured flow, at several conditions.

Turning now to FIG. 6, there is illustrated a schematic graph representing various situations of measured flow consumption MC versus actual flow consumption AC, in volumetric units, e.g. m3. The line marked I represents the ideal situation where actual water consumption is essentially identical to measured water consumption in a linear fashion. However, this situation will usually not occur owing to the design of common flow meters, e.g. domestic water meters etc., whereby an impeller is provided, the latter gaining inertial forces subject to velocity of water flowing therethrough. Accordingly, even after termination of liquid flow through the flow meter, the impeller will tend to continue revolving for a while, owing to said inertial forces. It is appreciated that this situation is not desired in particular where monitoring of liquid flow is of importance or where it is desired to correctly charge for actual water consumption.

The measured consumption MC for a typical flow meter not fitted with a device in accordance with the present invention is represented by line II and it is thus appreciated that there is a significant portion of unmeasured liquid which cannot be measured and respectively charged.

Upon installation of a valve in accordance with some embodiments, the flow meter will yield an 'over efficient' performance illustrated in FIG. 6 by the line marked III, i.e. measuring quantities of water which in fact were not consumed. This phenomena takes place owing to many occurrences of closing and opening the valve, involving inertia forces.

Accordingly, it is desirable to introduce a device which will compensate for the 'over efficiency' and will reach a measured consumption near to actual consumption as illustrated for example by line marked IV.

It is appreciated that for good orders sake the performance of the valve in accordance with the line marked IV extends below the optimal line marked I, so as to ensure that the consumer remains under charged rather than over charged.

Figure 7:
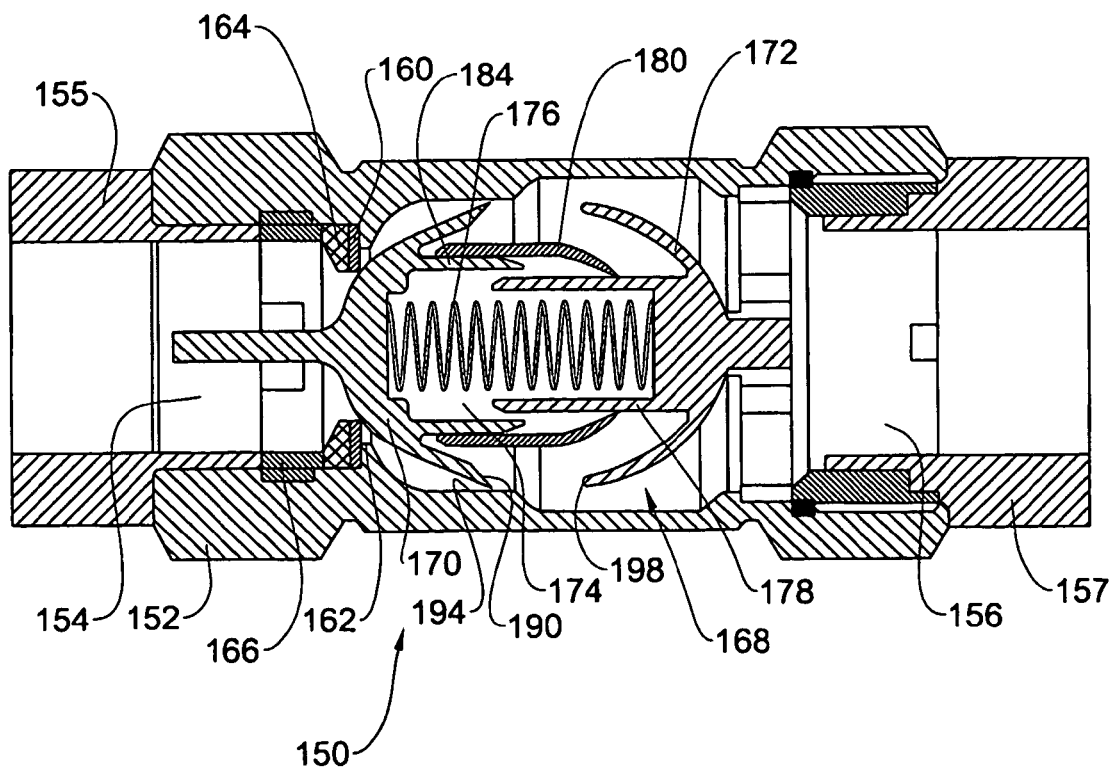
FIG. 7 is a longitudinal section through a flow responsive valve according to an embodiment of the present invention, fitted for controlled fluid flow restriction.

With further attention now directed to FIG. 7, there is illustrated a modification of the valve in accordance with the present invention, generally designated 150 comprising a housing 152, an inlet port 154 screw coupled to an upstream pipe section 155, and an outlet port 156 screw coupled to a downstream pipe section 157.

Fitted at the inlet and of the housing there is provided a diaphragm seal 160 retained between an annular shoulder portion 162 of the housing and a diaphragm support disk 164 retained by a retention nut 166, whereby the diaphragm seal 160 is deformable only in a downstream direction, as will be apparent hereinafter, in connection with FIG. 8C.

Diaphragm seal 160 tends to follow displacement of a plunger 170 owing to pressure differential about its faces. However, at a certain stage the diaphragm seal disengages from the plunger and will return to its normal position at rest.

A pressure responsive sealing assembly is received within the housing 152, comprising an axially displaceable plunger 170 and a stationary cup member 172.

Formed between the plunger 170 and the cup member 172 there is a dampening assembly received within a confined space 174, which in the present examples holds a coiled spring 176 received within the cylindrical sleeve 178 of the cup member 172, said spring biasing at one end against the cup member 172 and at an opposed end thereof against the plunger 170. A sealing sleeve 180, made of a resilient material, is applied over the cylindrical extension 184 of the plunger 170 and 178 of the cup member 172, to thereby restrict liquid flow into the confined space 174.

The circumferential peripheral edge 190 of the plunger 170 is sharp-edged serving as a scraper bearing against the cylindrical surface 194 of the housing, continuously cleaning it from scale, algae and other dirt particles, as the plunger 170 axially displaces within the housing.

Figure 8A:
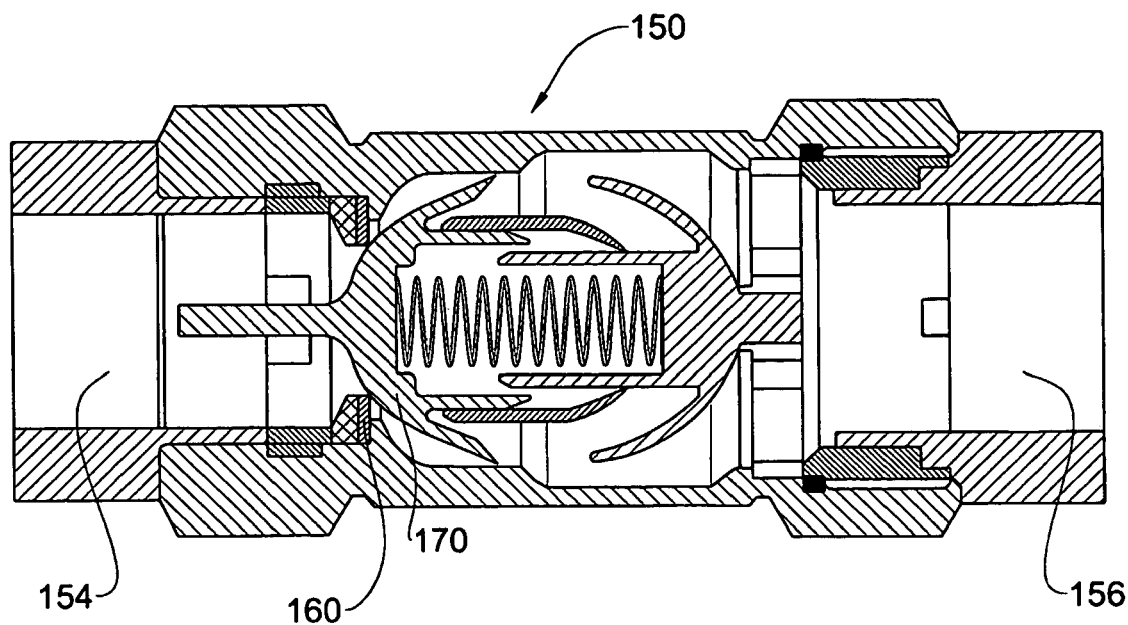
FIGS. 8A to 8F are longitudinal sections through the valve of FIG. 7, at consecutive operative positions.
Figure 8B:
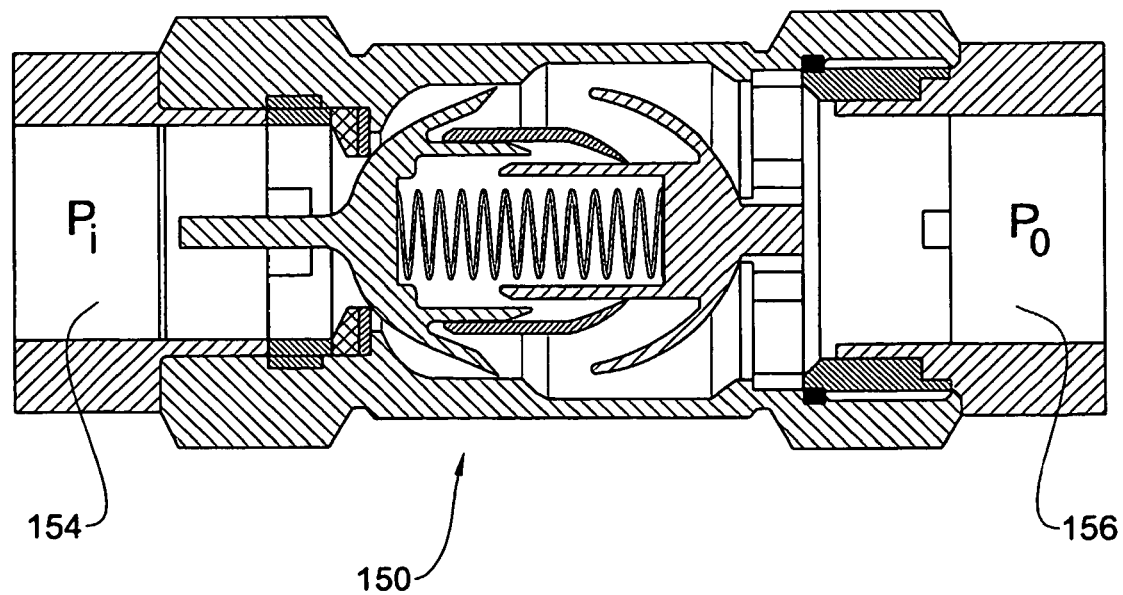
Figure 8C:
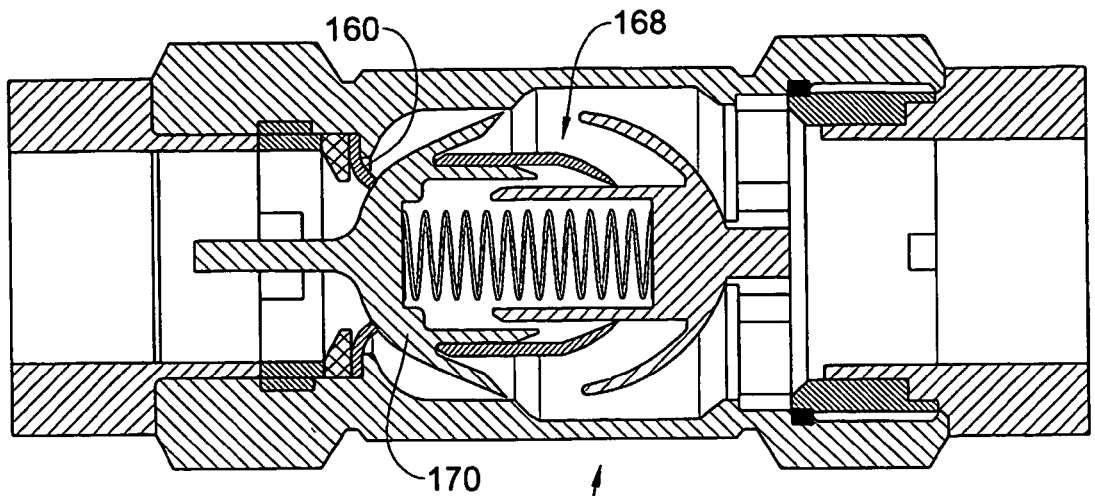
Figure 8D:
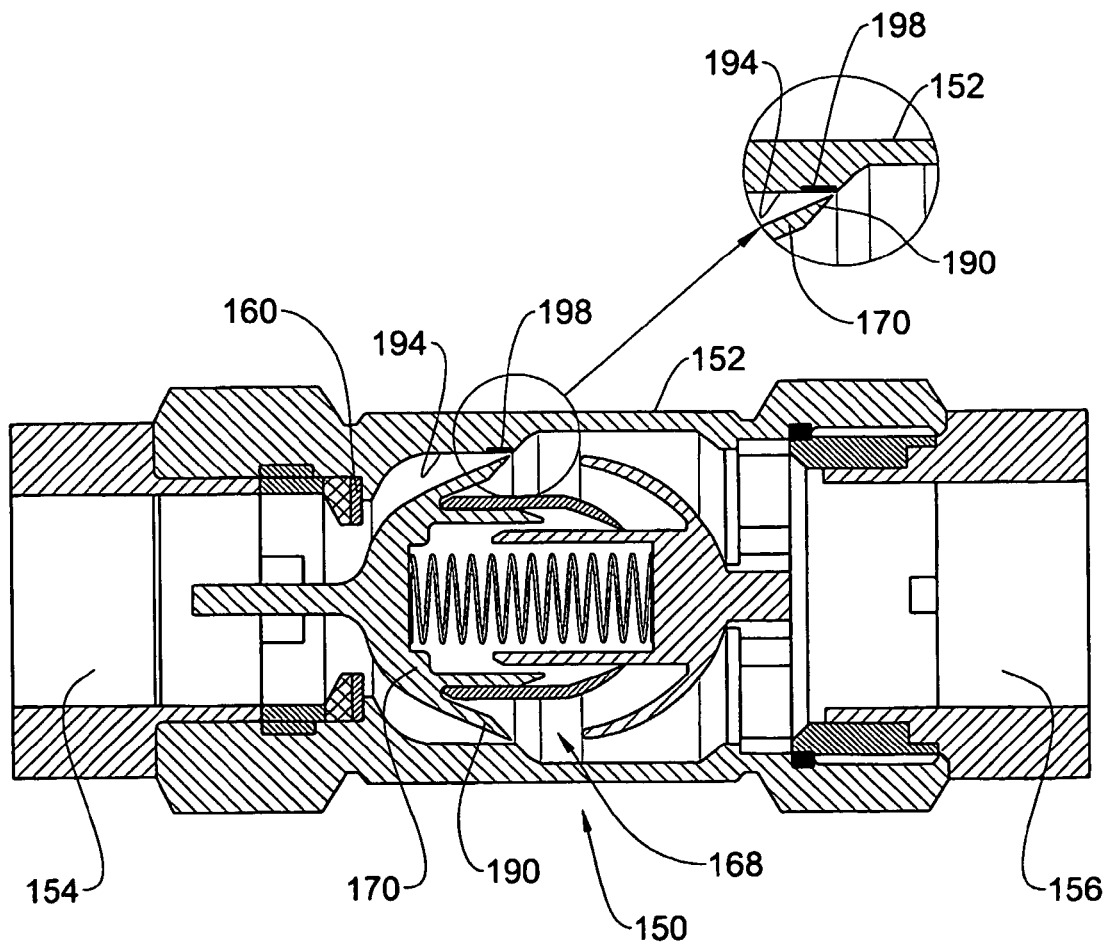
Figure 8E:
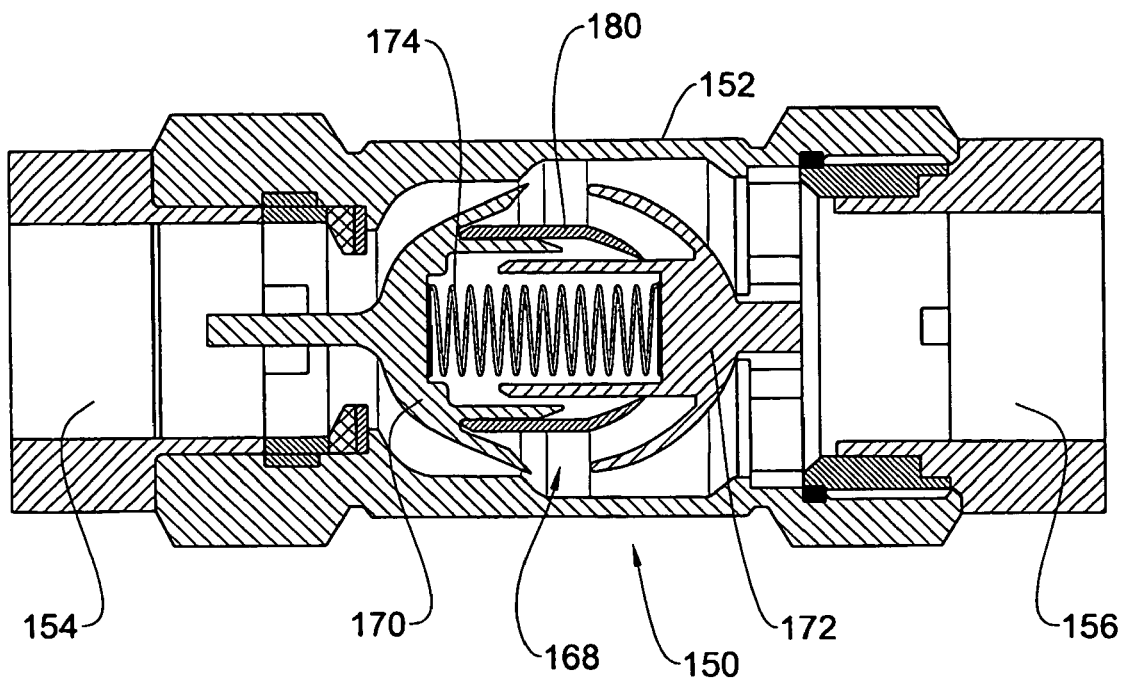
Figure 8F:
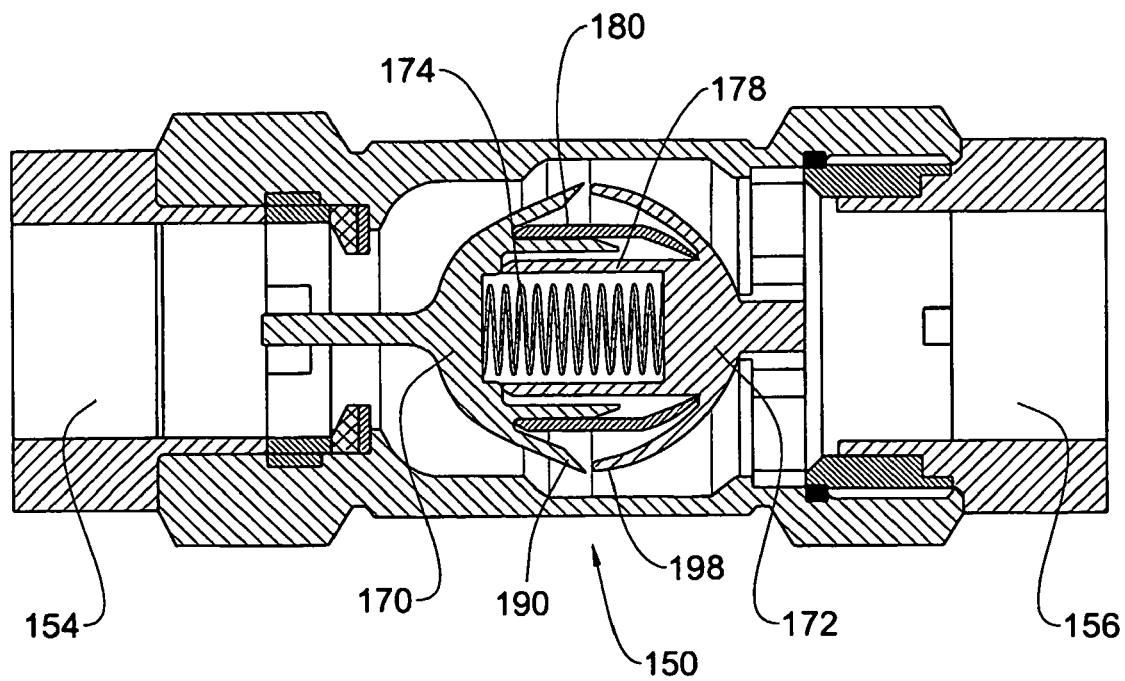

According to a particular embodiment, as illustrated in FIG. 7, the plunger 170 and the cup member 172 have complementary shapes offering an advantage in particular in the completely open position of FIG. 8F, upon water consumption downstream. Furthermore, it is noted that the circumferential peripheral edge 198 of the cup member 172 is chamfered so as to easily engage with the corresponding scraper edge 190 of the plunger 170.

Further attention is now directed to FIGS. 8A to 8F, illustrating how the valve in accordance with the embodiment of FIG. 7 actually operates. In FIG. 8A, plunger 170 is in its retracted position, remote from the cup member 172 and sealingly bearing against the diaphragm seal 160. This position is the so-called closed position wherein there is no water consumption and no water leak. In this situation, water pressure at the inlet port 154 is substantially equal to the pressure at the outlet port 156, i.e., the pressure differential $\Delta P$ equals 0 namely, the inlet pressure equals the outlet pressure (Pi=Po).

However, at the position illustrated in FIG. 8B, the valve 150 is still at the so-called closed position with no significant water consumption downstream of the valve, however, with some water leak occurring, at a flow rate which is below the measurable threshold of the water metering device (not shown). This results in pressure decrease at the outlet side of the valve 150, building up a pressure differential $\Delta P \geqq 0$ over the valve, where Pi is greater than Po. However, the pressure differential is still not significant and will not displace the valve into the open position. For the sake of clarity, high pressure zone is indicated in FIGS. 8A-8F by dense dotting whereas low pressure zone at the valve is indicated by non-densed dotting. It is apparent that in the situation of FIG. 8B the valve remains in the closed and sealed position wherein the diaphragm seal 170 sealingly bears against the diaphragm seal 160.

Resulting in further leakage, downstream of the valve 150 (however with no significant consumption) the pressure differential over the device 150 increases, causing the plunger 170 to slightly extract in a downstream direction, however followed by deformation of the diaphragm seal 160 which follows the plunger 170 and ensures that the valve is closed. It is apparent that as long as no water flow occurs between the inlet port towards the outlet port, the water metering device (not shown) does not sense any flow and will not indicate flow as the measuring element (e.g. an impeller) remains still.

As the pressure continues to drop at the outlet port 156, water leaks through an interstice between the plunger 170 and the surface 194 of the housing 152, resulting in slight pressure increase at the outlet port 156, and further resulting in displacement of the diaphragm seal 160 to its normal position as in FIG. 8D.

In order to facilitate leakage between the scraper edge 190 of the plunger 170 and the surface 194, one or more narrow grooves 198 are formed at contact zone of the scraper edge 190 with the surface 194, as illustrated in the enlarged portion of FIG. 8D.

Disengagement of the diaphragm seal 160 from the plunger 170 (FIG. 8D) results in further displacement of the plunger 170 towards the cup member 172, whereby water flow is increased, further resulting in pressure equilibrium about the sealing assembly 168. Such an increase in water flow is above the minimal readable threshold of the metering device (not shown) and thus the water now flowing through the device at such a pulsating opening of the valve, is measurable by the flow meter.

The restricted flow at the position of FIG. 8D ensures that the impeller of the flow metering device does not spin at high speed and thus does not gain high inertial forces and accordingly, when a flow pulse through the valve device 150 ceases, the impeller of the flow meter will immediately halt thus not incurring excessive metering.

In this position, the sealing sleeve 180 facilitates slow filling of water into the confined space 174, thus dampening/slowing the closing stage of the valve, thereby improving the ratio between the measured consumption MC and the actual consumption AC.

It is however appreciated that the position of FIG. 8E is not a water consuming position but rather a position in which the piping downstream is refilled at a measurable pulse of water flow, to compensate for the water which has dripped from the piping and from the different supply devices.

With further reference to FIG. 8F, the valve 150 is illustrated in a completely opened position wherein water is consumed by a consumer downstream (not shown) resulting in complete displacement of the plunger 170 into engagement of the edges 170 with the corresponding edge 198 of the cup member 172, to give rise to an egg-like aerodynamic shape, facilitating water flow in a downstream direction at high flow rate, as per demand.

The addition of a dampening assembly, i.e. the sealing sleeve 180 or any other damping means, e.g. a viscous fluid, friction arrangements, water orifice, etc. will result in measured consumption MC near to line IV in FIG. 6 whilst in the absence of such a damping assembly, the measured consumption is near to line III in FIG. 6.

At the absence of sealing sleeve 180, one would possibly sense a short delay in water supply upon consumption downstream, e.g. upon opening a tap, etc., owing to water first entering the confined space 174 and only then flowing through the outlet 156 downstream. However, applying the elastic sealing sleeve 180 ensures that upon rapid build up of differential pressure over the device (as a result of water consumption downstream), above a predetermined threshold, the sealing sleeve 180 will deform to disengage from the cylindrical portion 178 of the cup member 172, thus facilitating rapid draining of the confined space 174, whereby a consumer downstream does not feel a pressure drop.

It is appreciated that the above embodiments are merely example of valves suitable for use with a metering system and method as disclosed above and many other such valves may be designed, all of which fall within the scope of the invention.

The invention claimed is:

1. A fluid metering system comprising a fluid supply line and a flow meter for measuring fluid flow therethrough, said flow meter having a minimum measuring flow threshold; the system further comprising a flow responsive valve having an inlet port and an outlet port; said valve being shiftable between an open position to measure consumed flow rates, which are above the minimum measuring flow threshold, and a pulsating position, in which said valve is adapted either to prohibit fluid flow to the fluid supply line until a pressure differential over the valve ports is being built-up due to consumed flow rates, which occur below the measuring flow threshold or to admit fluid flow into the supply line until the pressure differential diminishes below a predetermined threshold, said flow meter adapted to measure the admitted fluid flow,
   a. wherein portions of the supply line and devices fitted thereon, downstream of said pressure controlled valve, act as an in line fluid accumulator, and
   b. wherein said valve has an open position admitting fluid flow only at a flow rate above the minimum measuring flow threshold, and a closed position substantially restricting fluid flow at flow rates below the measuring threshold, and is exclusive of an accumulator used for boosting fluid flow through the valve.

2. The fluid metering system according to claim 1, wherein the valve is a normally closed pressure controlled valve.

3. The fluid metering system according to claim 1, wherein the valve is fitted adjacent before or after the flow meter.

4. The fluid metering system according to claim 1, wherein the valve is integrated with the flow meter.

5. The fluid metering system according to claim 1, wherein the system is a liquid supply network.

6. The fluid metering system according to claim 5, wherein the system is a municipal water supply network.

7. The fluid metering system according to claim 1, wherein said valve is a flow responsive valve having an open position admitting fluid flow only at a flow rate above the minimum measuring flow threshold, and a closed position substantially restricting fluid flow at flow rates below the measuring threshold.

8. The fluid metering system according to claim 7, wherein said flow responsive valve is adapted to impart the system with a flow pattern having a pulsating character so as to substantially prohibit flow at a flow rate below the minimum measuring threshold, and resume flow of only measurable quantities of fluid.

9. The fluid metering system according to claim 8, wherein the flow responsive valve is shiftable between an open position whenever pressure differential over an inlet port and an outlet port thereof exceeds a minimum threshold, to thereby admit fluid flow at a flow rate above the minimum measuring flow threshold, and a closed position substantially prohibiting fluid flow therethrough.

10. The fluid metering system according to claim 1, wherein the valve is a one way valve, adapted to prevent flow in an upstream direction.

11. A method for metering fluid flow through a fluid supply line, said method comprising:
    providing a flow meter for measuring fluid flow through the supply line, said flow meter having a minimum measuring flow threshold;
    providing a valve having an inlet port and an outlet port;
    measuring consumed flow rates, exclusive of use of an accumulator for boosting fluid flow through the valve, which are above the minimum measuring flow threshold, or
    imparting the supply line with a flow pattern having a pulsating character in which said valve is adapted either to prohibit fluid flow to the fluid supply line until a pressure differential over the valve ports is being built due to consumed flow rates, which are below the measuring flow threshold or to admit fluid flow into the supply line until the pressure differential diminishes below a predetermined threshold;
    measuring the fluid flow with admitting thereof.

12. The method for metering fluid flow according to claim 11, wherein average fluid flow through the supply line is kept constant over time so long as flow rate fluctuations in the supply line are not acknowledgeable.

13. The method for metering fluid flow according to claim 11, comprising fitting said valve adjacent to or integrally with the flow meter.

14. The method for metering fluid flow according to claim 11, wherein portions of the supply line and devices fitted thereon, downstream of said valve, act as a fluid accumulator.

15. A valve comprising an inlet port connectable to an upstream side of a fluid supply line, and an outlet port connectable to an downstream side of the fluid supply line; said valve further comprising a housing with a control chamber extending between the inlet port and the outlet port and a sealing member disposed within said control chamber; said sealing member having an inlet sealing surface having a sealing surface area and a control portion having a control surface area; and a bleed aperture determining a minimal flow threshold through the control chamber; the sealing member is displaceable between an open position and a closed position depending on a pressure differential over the sealing member, said valve adapted to prohibit fluid flow to the fluid supply line until a pressure differential over the valve ports is built up to a pressure differential due to consumed flow rates in the fluid supply line below the measuring flow threshold, wherein said valve has an open position admitting fluid flow only at a flow rate above the minimum measuring flow threshold, and a closed position substantially restricting fluid flow at flow rates below the measuring threshold, and is exclusive of an accumulator used for boosting fluid flow through the valve.

16. The valve according to claim 15, being a normally closed flow responsive valve and wherein the sealing member is biased into sealing engagement with the inlet port.

17. The valve according to claim 16, wherein the sealing member is spring biased into sealing engagement with the inlet port.

18. The valve according to claim 16, wherein the sealing member is magnetically biased into sealing engagement with the inlet port.

19. The valve according to claim 18 wherein the sealing member comprises a ferromagnetic member and the housing is fitted with a fixed magnetic biasing member, to thereby bias the sealing member into sealing engagement with the inlet port.

20. The valve according to claim 19, wherein the sealing member is coated with a resilient material.

21. The valve according to claim 15, said valve is adapted to impart the fluid supply line with a pulsating fluid flow pattern, corresponding to the closed position or the open position of the sealing member, and wherein the valve is adapted to keep an average fluid flow through the supply line constant over time so long as flow rate fluctuations in the supply line are not acknowledgeable.

22. The valve according to claim 15, wherein the sealing surface area is less than the control surface area.

23. The valve according to claim 15, wherein the bleed aperture is an interstice between the housing and the control portion.

24. The valve according to claim 16, wherein the sealing member and the control chamber are configured and dimensioned so as to increase flow speed at a downstream side of the sealing member when it is in the open position to thereby give rise to a force in a direction opposed to a sealing force acting on the sealing member.

25. The valve according to claim 23, wherein the sealing surface area is a cylindrical bore extending through the housing; the bore is formed with an expanded portion and the sealing member is formed with a tapering portion corresponding with the expanded portion.

26. The valve according to claim 15 being a one way valve, preventing flow in an upstream direction.

27. A flow responsive valve for a flow metering system comprising a supply line and a fluid meter having a minimum measuring flow threshold; said flow responsive valve having an inlet port and an outlet port and being shiftable between an open position to measure consumed flow rates, which are above the minimum measuring flow threshold, and a pulsating position in which the valve is adapted either to prohibit fluid flow to the fluid supply line until a pressure differential over the valve ports is being built due to consumed flow rates, which are below the measuring flow threshold or to admit fluid flow into the supply line until the pressure differential diminishes below a predetermined threshold, wherein said valve has an open position admitting fluid flow only at a flow rate above the minimum measuring flow threshold, and a closed position substantially restricting fluid flow at flow rates below the measuring threshold, and is exclusive of an accumulator used for boosting fluid flow through the valve.

28. The flow responsive valve according to claim 27 which is adapted to alter between a closed state essentially prohibiting fluid flow therethrough at flow rates below the minimum measuring flow threshold, and an open state admitting fluid flow into the supply line at a measurable flow rate above the minimum measuring flow threshold; said valve further comprising a suspension mechanism for delaying fluid flow through the valve at the open state.

29. The flow responsive valve according to claim 28, wherein the suspension mechanism comprises a pressure responsive sealing assembly comprising an axially displaceable plunger and a stationary cup member with a damping assembly received therebetween to dampen axial displacement of the plunger.

30. The flow responsive valve according to claim 29, wherein the damping assembly is received within a confined space and is provided with a sealing sleeve applied for restricting liquid flow into the confined space.

31. The flow responsive valve according to claim 29, wherein the pressure responsive sealing assembly further comprises a diaphragm seal retained within a housing and being deformable only in a downstream direction.

32. The flow responsive valve according to claim 29, wherein facing edges of the plunger and the stationary cup member have complimentary mating shapes.

33. The flow responsive valve according to claim 30, wherein the damping assembly comprises a biasing spring bearing at one end against the stationary cup member and at an opposed end against the plunger.

34. The flow responsive valve according to claim 31, wherein at a closed state thereof the plunger is retracted from the cup member and sealingly bears against the diaphragm seal, where liquid does not flow through the valve, and where inlet pressure Pi is equal to outlet pressure Po.

35. The flow responsive valve according to claim 31, wherein upon pressure differential built-up over the valve ports, the plunger is extractable downstream, followed by deformation of the diaphragm seal, to thereby open the valve.

36. The flow responsive valve according to claim 31, wherein disengagement of the diaphragm seal from the plunger results in further displacement of the plunger towards the stationary cup member, to thereby increase liquid flow through the valve, when it is in the pulsating position and at a measurable flow rate.

37. The flow responsive valve according to claim 31, wherein at the open state of the valve the plunger is displaceable until engagement with the stationary cup member thus facilitating liquid flow at a considerable flow rate.

38. The flow responsive valve according to claim 29, wherein at the fully open state of the valve the plunger mates with the stationary cup member to form an egg-like shape.

39. A flow responsive valve for a flow metering system comprising a supply line and a fluid meter having a minimum measuring flow threshold; said flow responsive valve having an inlet port and an outlet port and being shiftable between an open position to measure consumed flow rates, which are above the minimum measuring flow threshold, and a pulsating position in which the valve is adapted either to periodically prohibit fluid flow to the fluid supply line until a pressure differential over the valve ports is being built due to consumed flow rates, which are below the measuring flow threshold or to admit fluid flow into the supply line until the pressure differential diminishes below a predetermined threshold;

the valve adapted to alter between a closed state essentially prohibiting fluid flow therethrough at flow rates below the minimum measuring flow threshold, and an open state admitting fluid flow into the supply line at a measurable flow rate above the minimum measuring flow threshold exclusive of an accumulator used for boosting fluid flow through the valve; said valve further comprising a suspension mechanism for delaying fluid flow through the valve at the open state, wherein the suspension mechanism comprises a pressure responsive sealing assembly comprising an axially displaceable plunger and a stationary cup member with a damping assembly received therebetween to dampen axial displacement of the plunger, and, wherein the plunger is provided with a circumferential peripheral adapted to displace against a cylindrical surface of the housing to thereby scrape it from dirt.

40. A fluid metering system comprising a fluid supply line and a meter for measuring fluid flow therethrough, said meter comprising a fluid flow responsive impeller and having a minimum measuring flow threshold; the system further comprising a flow responsive valve having an inlet port and an outlet port; said valve being shiftable between an open position to measure consumed flow rates, which are above the minimum measuring flow threshold, and a pulsating position, in which said valve is adapted either to prohibit fluid flow to the fluid supply line until a pressure differential over the valve ports is being built-up due to consumed flow rates, which are below the measuring flow threshold or to admit fluid flow into the supply line, exclusive of use of an accumulator for boosting fluid flow through the valve, until the pressure differential diminishes below a predetermined threshold, and said valve further comprising a suspension mechanism for delaying fluid flow through the valve when it admits the fluid flow.

* * * * *